UNITED STATES PATENT OFFICE.

BENJAMIN A. ALLISON, OF EDWARDSVILLE, ILLINOIS, ASSIGNOR TO THE BARBER ASPHALT PAVING COMPANY, OF PHILADELPHIA, PENNSYLVANIA, A CORPORATION OF WEST VIRGINIA.

RECOVERY OF FIBER AND ASPHALT FROM ROOFING-SCRAP.

1,293,293.

Specification of Letters Patent.  Patented Feb. 4, 1919.

No Drawing.   Application filed October 7, 1918.   Serial No. 257,290.

*To all whom it may concern:*

Be it known that I, BENJAMIN A. ALLISON, a citizen of the United States, and a resident of Edwardsville, in the county of Madison and State of Illinois, have invented certain new and useful Improvements in the Recovery of Fiber and Asphalt from Roofing-Scrap, whereof the following is a specification.

In the manufacture of prepared roofing, shingles, bituminous insulating paper, etc., there is considerable waste material, which is known as scrap roofing or scrap paper.

This material consists generally of pieces which have not been thoroughly impregnated with the saturating material, or which have not been uniformly coated with the coating material, or which are defective in some other manner.

These scraps contain large quantities of animal or vegetable fibers, felted together. They also contain a quantity of asphalt, but in their condition as scrap these materials are of little value and the waste of this material has been a source of considerable loss to roofing manufacturers. Means heretofore devised for the recovery from it of the fiber or asphalt have required expensive machinery, and great difficulty has been encountered in accomplishing the recovery or utilization thereof.

My process for the recovery and utilization of this scrap material consists in heating or boiling it in an alkaline solution, whereby without any complete separation between the asphalt and fiber, there is produced a sufficiently homogeneous new combination of fiber and asphalt to allow of its being used for various industrial purposes.

In the practice of my process I prepare a solution of about 5% of alkali, although the proportions may be varied, a greater percentage of alkali being required in connection with heavily coated scrap roofing. In this solution I introduce the scrap material and raise the temperature of the mixture to the boiling point. The disintegration is hastened by stirring it by any convenient mechanical means, such as a beating engine or other agitator, the object of this agitation being to separate the individual fibers to as great an extent as is possible without destroying the same. I find that by boiling in the alkaline solution, with sufficient agitation, the individual fibers are caused to separate more or less from each other, and to float in the alkaline solution, thus forming a fibrous mass in connection with which a greater or less amount of asphalt is necessarily present; but, notwithstanding the presence of this asphalt, my process produces a compact and fairly homogeneous mass of fiber. After the disintegration has been completed, the alkaline solution is drawn off and may be used again in the treatment of subsequent batches of the same sort of material. The remaining fibrous material with such asphalt as is present, may be washed to remove the excess of alkali, although under some circumstances I find it advantageous to use the material without washing. This fibrous material is then dried to a greater or less extent and rolled into sheets which are useful for insulating purposes, such as refrigerator cars, ice chests, etc. If, before rolling the fibrous mass a sufficient addition of asphalt be made, the material may be rolled, not only into insulating sheets, but also sheets suitable for asphalt shingles, or prepared roofing. If a still larger proportion of asphalt of a proper consistency be added, the material may be rolled or molded into sheets or slabs of the desired size for use as expansion joints.

Having thus described my invention, I claim:

1. The process of recovering fibrous and bituminous materials from roofing scrap, which consists in boiling the scrap in an alkaline solution, accompanied with agitation, removing the resulting disintegrated mass of fibrous and asphalt material, and rolling the same into sheets.

2. The process of recovering fibrous and bituminous materials from roofing scrap, which consists in boiling the scrap in an alkaline solution, accompanied with agitation, removing the resulting disintegrated mass of fibrous and asphalt material, adding additional asphalt thereto, and rolling the same into sheets.

3. The process of recovering fibrous and bituminous materials from roofing scrap, which consists in boiling the scrap in an alkaline solution, accompanied with agitation, removing the resulting disintegrated mass of fibrous and asphalt material, adding additional asphalt thereto, and compressing the same into shape.

In witness whereof, I have hereunto signed my name, at Madison, Illinois, this 24th day of September 1918.

BENJAMIN A. ALLISON.

Witnesses:
JOHN M. CONNELL,
WELDON G. HUFFMAN.